United States Patent [19]
Greenley et al.

[11] Patent Number: 5,904,732
[45] Date of Patent: May 18, 1999

[54] DYNAMIC PRIORITY SWITCHING OF LOAD AND STORE BUFFERS IN SUPERSCALAR PROCESSOR

[75] Inventors: Dale Greenley, Los Gatos; Leslie Kohn, Fremont, both of Calif.

[73] Assignee: Sun Microsystems, Inc., Palo Alto, Calif.

[21] Appl. No.: 08/641,206

[22] Filed: Apr. 30, 1996

Related U.S. Application Data

[63] Continuation of application No. 08/361,290, Dec. 22, 1994, abandoned.

[51] Int. Cl.⁶ .................................................. G06F 13/00
[52] U.S. Cl. ............................. 710/57; 712/23; 710/53; 711/158
[58] Field of Search ...................... 711/158; 395/800.23, 395/876, 877, 873

[56] References Cited

U.S. PATENT DOCUMENTS

| | | | |
|---|---|---|---|
| 4,298,954 | 11/1981 | Bigelow et al. | 710/53 |
| 4,860,193 | 8/1989 | Bentley et al. | 710/55 |
| 4,888,739 | 12/1989 | Frederick et al. | 365/221 |
| 4,969,164 | 11/1990 | Mehta et al. | 377/41 |
| 5,125,096 | 6/1992 | Brantley et al. | 709/235 |
| 5,369,775 | 11/1994 | Yamasaki et al. | 712/25 |
| 5,524,263 | 6/1996 | Griffith et al. | 712/23 |
| 5,694,553 | 12/1997 | Abramson et al. | 712/23 |

OTHER PUBLICATIONS

Tanenbaum; Modern Operating Systems; pp. 56–71, 1992.

*Primary Examiner*—Krisna Lim
*Assistant Examiner*—Kenneth R. Coulter
*Attorney, Agent, or Firm*—Limbach & Limbach L.L.P.

[57] ABSTRACT

A method and apparatus for dynamically switching the relative priorities of the load buffer and store buffer with respect to external memory resources in a superscalar processor. According to a first embodiment, a protocol dictates that the load buffer always prevails until the store buffer reaches a certain "high water mark," (an upper threshold) at which time the store buffer gains priority. After the store buffer has gained priority, it continues to access the memory until it is depleted to a "low water mark," (a lower threshold) at which time the load buffer regains priority. Whenever the store buffer reaches the high water mark, it gains priority until it drains down to the low water mark. This reduces the tendency for the store buffer to become full and block the processor. According to a second embodiment, the load buffer prevails if it is above its high water mark. If the load buffer is below its high water mark, the load buffer prevails until the store buffer reaches its high water mark, at which time the store buffer gains priority. After the store buffer has gained priority, it maintains priority until the load buffer reaches its high water mark. This reduces the tendency for either buffer to become full and block the processor.

19 Claims, 7 Drawing Sheets

DYNAMIC PRIORITY SWITCHING OF LOAD AND STORE BUFFERS IN SUPERSCALAR PROCESSOR

This is a continuation of application Ser. No. 08/361,290 filed on Dec. 22, 1994 now abandoned.

BACKGROUND OF THE INVENTION

1. Field of the Invention

The present invention relates to the field of microprocessor load/store execution units. Specifically, the invention relates to dynamically controlling the priority between a load buffer and a store buffer which compete for memory resources in a load/store unit of a microprocessor.

2. Discussion of the Prior Art

RISC stands for Reduced Instruction Set Computing. RISC processors normally include fewer instructions than their CISC (Complex Instruction Set Computing) predecessors. At least to some extent, the use of RISC technology simplifies the task of writing compilers for the RISC processors, since there are fewer instructions to use. Moreover, the processor design can focus on implementing and optimizing the important, frequently-used instructions, rather than having some complex, seldom-used instruction constrain the maximum operating frequency. For these reasons and others, RISC processors are gaining popularity amongst workstation and even lower-end computer makers.

In a RISC processor, it is common that very few instructions actually access memory. In fact, some implementations may have only two instructions, LOAD and STORE, that access memory. Typically, a few specialized "atomic" operations may also be supported by the processor for synchronization and memory updates by concurrent processes. See *The SPARC Architecture Manual, Version* 9, SPARC International, Inc., D. L. Weaver and T. Germond, Editors, PTR Prentice Hall, 1994, p.17. Even in such cases, the LOAD and STORE are by far the most frequently-used memory access instructions. The execution of a LOAD instruction will cause a processor register to be written with data resident in a main memory address. The execution of a STORE instruction will cause a main memory address to be written with data resident in a processor register. Therefore, LOAD and STORE instructions need to specify a register or registers and a memory address as operands. In some implementations, two registers or a register and an immediate value are used to calculate the memory address. Many implementations provide several varieties of LOADs and STOREs which transfer one or more words of data using one instruction; therefore, more than one source or destination register may exist. These source or destination registers are also designated as operands in the STORE or LOAD instructions, respectively.

Figure 1:
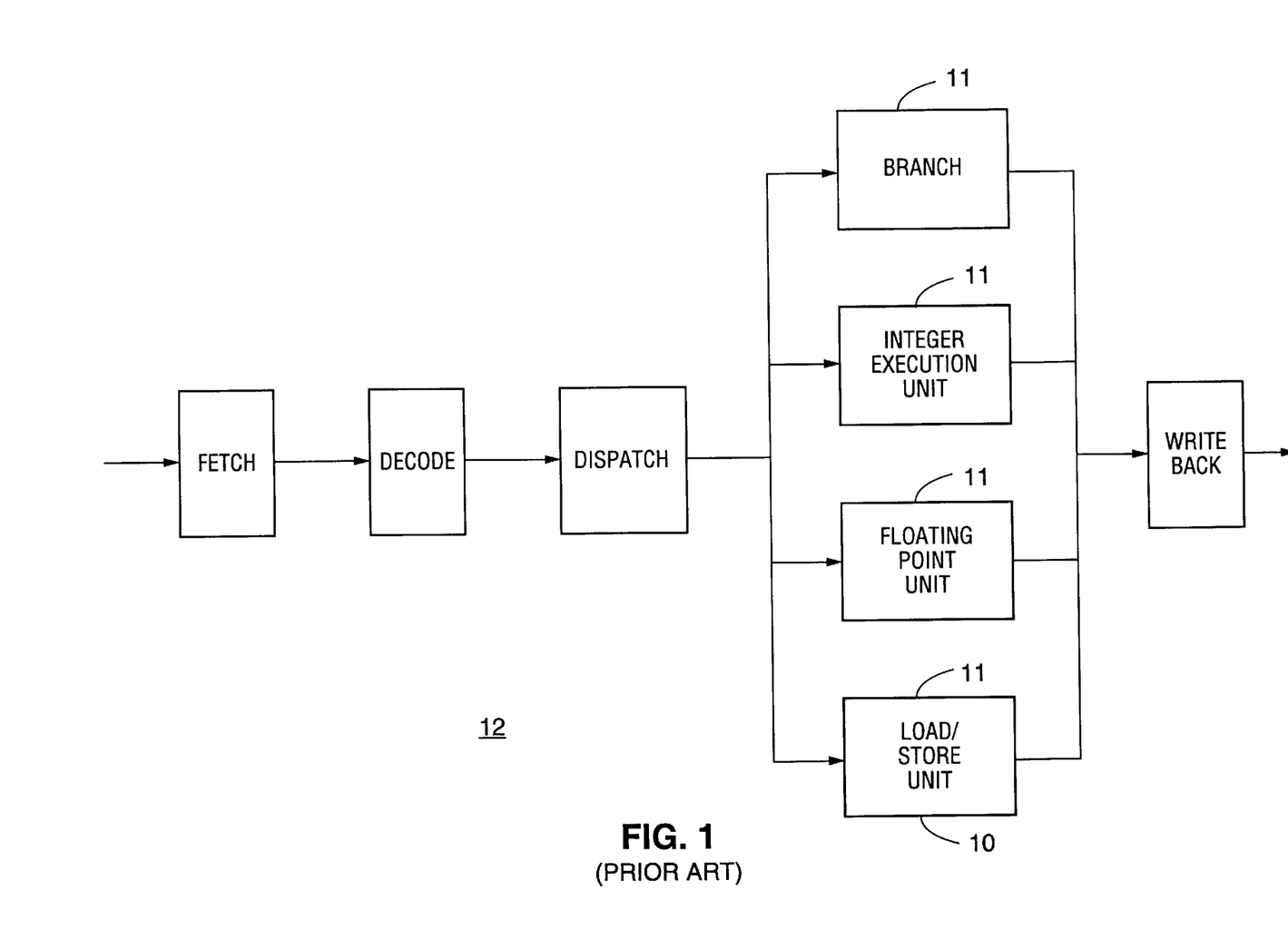
FIG. 1 is a simplified block diagram of a prior art superscalar processor architecture.

Referring to FIG. 1, a superscalar processor 12 is shown. The superscalar processor 12 has several parallel functional units 10 and 11. Some typical superscalar implementations include floating point, integer, branch, and load/store functional units. Thus, up to four instructions may be executed in parallel. Most superscalar processors will also be pipelined at least to some extent. Pipelining allows the processing of instructions to occur in stages, so that it takes several clock cycles before the processing of an instruction is completed. However, in a pipelined processor architecture, several instructions can be simultaneously processed since each stage is always processing an instruction.

Figure 2:
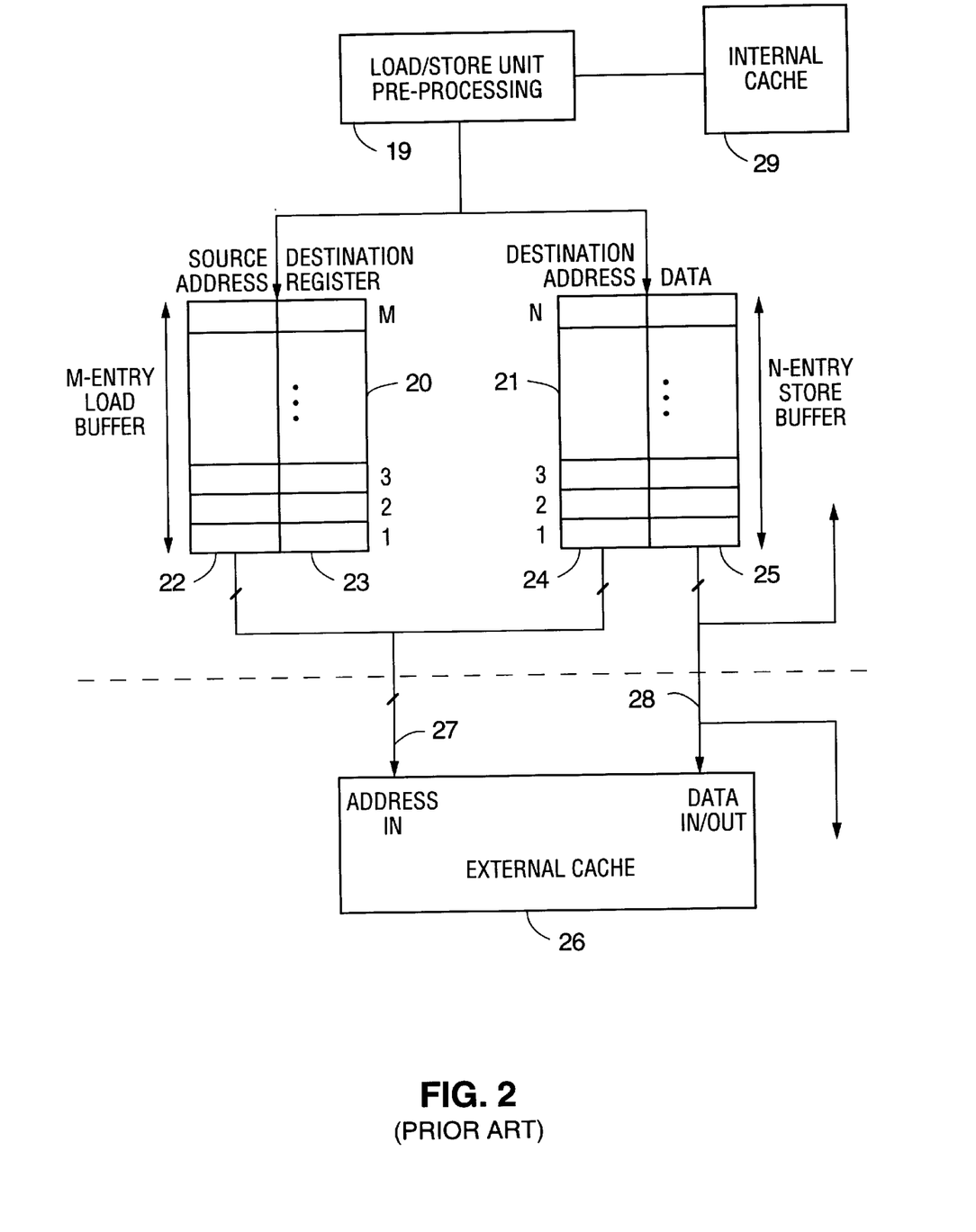
FIG. 2 is a simplified block diagram of a load/store unit, specifically showing the interface between the load buffer, store buffer, and external cache.

Referring to FIG. 2, a block diagram of the load/store unit 10 is shown. In order to maximize the total throughput of the load/store functional unit 10, a load buffer 20 and a store buffer 21 are provided so that loads and stores that cannot be immediately serviced can still be dispatched, and can wait to be serviced without holding up the operation of the processor 12. The load buffer 20 is a first-in-first-out (FIFO) queue which holds LOAD source memory 22 and destination register addresses 23. The store buffer 21 is a FIFO queue which holds STORE addresses 24 and the data 25 to be stored to those addresses. By maintaining queues for LOADs and STOREs, the utilization of memory resources used by the LOAD and STORE instructions is maximized since another memory operation is immediately available after the current operation is finished.

A common form of multi-layer memory system is cache memory, or lookaside buffer memory. A cache memory is a rather small, specialized memory device placed between the processor 12 and main memory system. The cache memory holds copies of words from main memory that are likely to be accessed by the processor 12. The cache is faster than main memory, thus if frequently accessed locations are found in the cache, the average memory access time will be small. Cache memory locations are redundant, in the sense that each is used to provide a more accessible copy of information also stored in slower main memory. The total addressable memory size, as seen by the programmer, is not increased by the presence of a cache. Many processors 12 have small internal caches and much larger external caches which are implemented on a separate integrated circuit. In other systems, only one cache exists between the processor 12 and main memory.

FIG. 2 shows a load/store pre-processing block 19 which interfaces with an internal cache 19 and the load and store buffers 20 & 21. The load and store buffers 20 & 21 interface with an external cache 26. Because the external cache 26 is on a separate integrated circuit, only one read/write port normally exists into the external cache 26. In modern processors, the unit of memory transfer, or subblock, is on the order of 144 bits or more, while the address for that sub-block is on the order of 20 bits or more. Most systems do not provide dual-ports for the external cache since it is far too expensive to do so. Providing two ports would require essentially doubling the already large number of pins on the external cache memory chip. This modification would increase the complexity of the package, increase the complexity of the external cache RAM (random access memory), and increase the number of wires on the circuit board. Potentially, the die size of the external cache could also increase. Moreover, the power consumption of the system would increase significantly since output pad drivers tend to consume a relatively large amount of the total power. For all these reasons, the external cache 26 normally has only one set of address lines 27 and one bi-directional set of data lines 28.

Because the external cache RAM 26 only has one read/write port, the entries in the load buffer 20 and the entries in the store buffer 21 tend to compete for the external cache RAM 26 resource. At any given time, both the load buffer 20 and the store buffer 21 may have entries. Since only one LOAD or STORE instruction may be processed by the external cache 26 at any given time, if the load and store buffers 20 & 21 both have entries, one of the buffers will be unable to dispatch its entry to the external cache 26.

A LOAD is a request to fetch data that a subsequent instruction will need to use as an operand. Therefore, a LOAD needs to happen relatively quickly. The compiler typically creates the instruction stream that separates LOADs from the instructions which utilize the loaded data by a sufficiently large time. However, if an instruction is ready to be executed before the load data which that instruction uses has been loaded, the processor 12 stalls. Thus, the latency with which LOADs need to occur is dependent upon how many instructions in the instruction stream separate a LOAD from the use of the loaded data. It is certainly preferable to place fewer constraints on the compiler, and to avoid processor stalls. By reducing the load latency, the number of intervening instructions between a LOAD and the use of the load data can be reduced without risking a processor stall.

The theory behind the load buffer 20 is that for code which has a working set that is too large to fit in the internal cache 29, a LOAD and its succeeding use can be separated, at least far enough to cover the latency of the external cache 26. If the LOAD and its use can be separated, several intervening instructions can be executed while the LOAD is occurring. The load buffer 20 allows the load/store functional unit 10 and the other execution pipelines 11 (in FIG. 1) to be somewhat decoupled in that LOADs which can not return data immediately will not stall the pipeline, but rather, be buffered until they can return data. A typical example of this is when a LOAD misses the internal cache 29 and must access the external cache 26. In that case, the LOAD will be placed in the load buffer 20, and the other functional unit pipelines 11 will continue moving so long as they do not encounter a "use" instruction.

On the other hand, STORE instructions do not have the strict timing constraints that LOADS have. When a STORE is issued, the processor 12 is sending data back to main memory. The stored data will probably not be needed at any time in the near future. If the stored data were needed in the near future, it would have been held in a register rather than stored to main memory.

Since the latency requirements for LOADs are more demanding than those for STORES, previous designs have given the load buffer entries priority over the store buffer entries when the two buffers are in competition for the external cache 26.

By always giving entries in the load buffer 20 priority over the entries in the store buffer 21, the store buffer 21 tends to become full. If the entries of the load buffer 20 are always serviced prior to the entries of the store buffer 21, the entries in the store buffer 21 are never serviced until the load buffer 20 is empty of entries which must access the external cache 26. As long as the load buffer 20 has entries which must access the external cache 26, STOREs are not processed.

Usually, the frequency of STORE operations in a program is significantly lower than that of LOADs. Nonetheless, if STOREs in the store buffer do not gain access to the external cache until the load buffer is empty, the store buffer 21 can fill up to the point that all its entries are occupied. Once the store buffer is full, the processor 12 is blocked from dispatching another STORE instruction. Once a STORE instruction is issued that can not be entered into the store buffer due to the store buffer being full, the load/store functional unit pipeline 10 (in FIG. 1) is blocked. Many modern superscalar processors 12 are intended to work with code which has been compiled so as to provide some flexibility in the order of instruction execution. Potentially however, the entire processor 12 may be blocked since almost all programming models place some constraints on the order of instruction execution. When a STORE instruction in the instruction stream can not be processed, it is possible that a few subsequent instructions may still be able to execute, but eventually the entire processor 12 will stall if the STORE instruction is not processed.

Thus, the prior art approach of allowing the load buffer 20 to always have priority suffers from the problem that the store buffer 21 become full and will block the processor 12 from its operations.

SUMMARY OF THE INVENTION

In modern superscalar microprocessors, a load buffer and a store buffer are utilized to queue pending LOADs and STOREs, respectively. These two buffers often compete for access to the memory.

According to a first embodiment of the present invention, a protocol dictates that the load buffer always prevails until the store buffer reaches a certain "high water mark," at which time the store buffer gains priority. After the store buffer has gained priority, it continues to access the memory until it is depleted to a "low water mark," at which time the load buffer regains priority. Whenever the store buffer reaches the high water mark, it gains priority until it drains down to the low water mark. This reduces the tendency for the store buffer to become full and block the processor.

According to a second embodiment of the present invention, the load buffer always prevails if it is above its high water mark. If the load buffer is below its high water mark, the load buffer prevails until the store buffer reaches its high water mark, at which time the store buffer gains priority. After the store buffer has gained priority, it maintains priority until the load buffer reaches its high water mark. This reduces the tendency for either buffer to become full and block the processor.

DETAILED DESCRIPTION OF THE INVENTION

FIG. 2 shows an M entry load buffer 20 and an N entry store buffer 21. In a modern microprocessor that uses a load buffer 20 and a store buffer 21, these two buffers must contend for the same memory resource, external cache 26. According to the present invention, a priority protocol is used that allows the store buffer 21 to gain priority when it is nearly full. The depth or number of entries of the load buffer 20 need not equal the depth of the store buffer 21. The number of entries in the buffers is dependent upon several factors. Some of the factors which might be considered in determining the optimum number of entries in the buffers are: the frequency with which LOADs and STOREs are expected in a typical instruction stream, the expected internal cache hit ratios, the external cache latencies, and the hardware expense of providing more entries. In an implementation used by applicants, the load buffer 20 is nine entries, and the store buffer 21 is eight entries.

According to a first embodiment of the present invention, the priority protocol is as follows. The load buffer 20 (in FIG. 2) maintains priority until the store buffer 30 (in FIG. 3) reaches a "high water mark" 31. When the store buffer 30 reaches the high water mark 31, the store buffer 30 gains priority until the store buffer 30 is depleted to a "low water mark" 32. When the store buffer 30 reaches the low water mark 32, priority shifts back to the load buffer 20.

Figure 3:
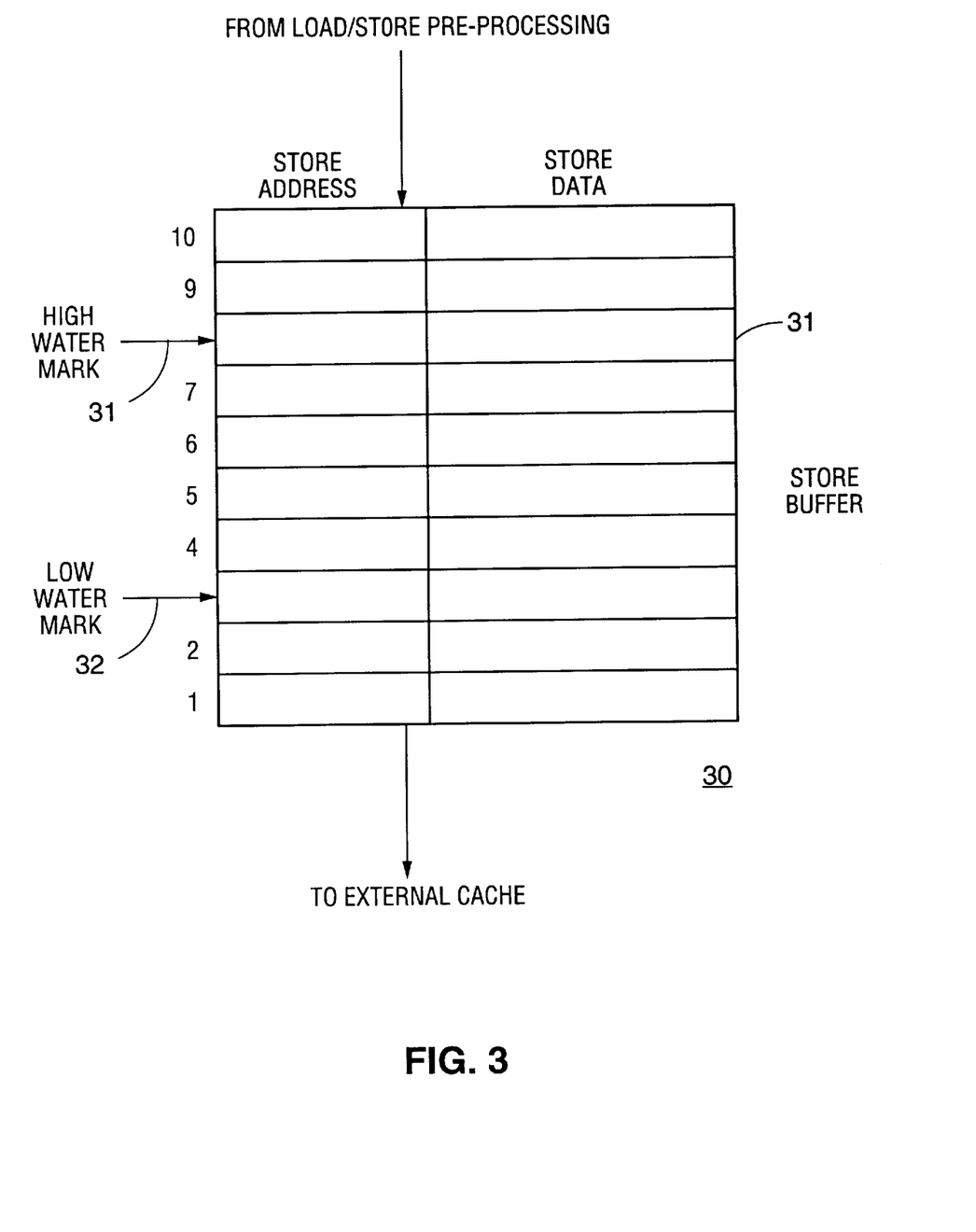
FIG. 3 illustrates a store buffer according to the first embodiment of the present invention.

For the sake of example, the store buffer 30 is shown in FIG. 3 with a depth of ten entries. An index for each entry is shown on the left of each entry. Both the load buffer 20 and the store buffer 30 are first-in-first-out (FIFO) buffers. As shown in FIG. 3, the input to the store buffer comes from the load/store pre-processing unit 19 (in FIG. 2). When a STORE is input into the store buffer 30, it is written into the entry with the lowest index which is not already occupied by a STORE waiting to be serviced. If the store buffer 30 were empty and the load buffer 20 was occupying the external cache 26, the STORE would be entered into the first store buffer entry (indexed 1 in FIG. 3). When the store buffer 30 is utilizing the external cache 26, the entry at position 1 is always being serviced. When that entry has been processed, all the remaining entries (indexed at i) are shifted down one position (to the entry indexed at i−1).

The buffers behave analogously to a silo of grain. When grain is dumped in, it falls to the lowest level available so that it is directly on top of the previously dumped grain. When the store buffer is given access to the external cache, the bottom of the silo is opened and some of the grain falls out while the rest of the grain moves down by some amount. This FIFO behavior is distinct from the type of FIFO in which a new STORE would be written into the 10th (last) entry regardless of whether entries 1 through 9 were occupied. In that case, the store buffer would be similar to a true shift register, in which case it would take ten clock cycles minimum before the STORE could be serviced.

In the actual implementation, the buffers may be implemented as actual shift registers which provide the capability to write through to the lowest unoccupied entry. In that case, the high water mark pointer and low water mark pointer are fixed values. Each LOAD or STORE would move one register closer to the bottom of the buffer when the bottom entry was serviced by the external cache.

More typically, however, the buffers are implemented as a small memory register file. In that case, the entries would not actually move as LOADs and STOREs were processed. Instead, a "top of stack pointer" and "bottom of stack pointer" would be maintained for each buffer. The bottom of stack pointer would point to the entry which is next to be serviced in that buffer. The top of stack pointer would point to the entry to which the next LOAD or STORE to enter the queue would be written. When a LOAD or STORE was serviced, the bottom of stack pointer would be incremented. When a new LOAD or STORE arrived into the buffer, the top of stack pointer would be incremented. A pointer incremented from the highest address in the register file would point to the lowest address; therefore, if N is the depth of the buffer and P is a pointer, when a pointer is incremented, new P=(old P+1) modulo N. Therefore, each buffer can be implemented as a register file with a pair of circulating pointers.

With either physical implementation, a convenient way to keep track of the levels of the buffers is by assigning a counter to each buffer which keeps track of the number of entries in that buffer. When a buffer is empty, the counter reads zero; when an entry enters the buffer, the counter is incremented. When an entry has been serviced, and is therefore removed from the buffer, the counter is decremented. The high water and low water marks can then be maintained as fixed values which are continually compared to the counter value to determine the state of the buffer priority. If applied to the circulating pointer implementation of the register file, the counter would be incremented whenever the top of stack pointer is incremented, and decremented whenever the bottom of stack pointer is incremented.

To simplify the explanation and illustration of the present invention, the Figures and description relate to the first type of implementation in which the same register is always at the bottom of the stack. The present invention is easily applied to the other type of implementation discussed above, and the claims are intended to cover that implementation as well.

Furthermore, the load and store buffers in the present invention are described as interfacing with an external cache. However, the techniques described herein could apply equally well to load and store buffers which interface directly with main memory or with some other module in the processor's memory implementation. The discussion with respect to the external cache is offered for illustrative purposes. The claims are intended to cover load and store buffer interfacing with other memory models as well.

It is worth noting that neither LOADs nor STOREs are confined to accessing the external cache only when their respective buffers have priority. The STOREs in the store buffer can access the external cache even when the load buffer has priority so long as the there are no LOADs in the load buffer requesting the external cache at the same time. This is the only way the store buffer was serviced according to the prior art approaches.

By understanding the dynamics of a given processor system, it can be determined when the store buffer 30 is dangerously close to blocking the execution pipeline. The latency of a STORE operation to the external cache 26 is typically greater than one cycle. If a STORE instruction is executed in every cycle, the store buffer 30 will become full and overflow even if it has priority. However, if certain constraints are placed upon the frequency of STORE instructions in the instruction stream, blocking due to the store buffer 30 being full can be eliminated.

For example, if it were known that a STORE to the external cache 26 takes S clock cycles, and that STORE instructions were scheduled so as not to occur more frequently than once every S cycles, then the store buffer 30 could be guaranteed not to block the execution pipeline. Assuming the LOAD latency was also S clock cycles, the high water mark 31 could be at entry N−1 of the N entry store buffer 30, which is very close to the "top" of the store buffer 30. Only one entry is required at the top of the store buffer 30 above the high water mark 31 because that is the maximum number of STORE instructions which could be dispatched before the oldest STORE in the store buffer 30 was completed. When the store buffer 30 reaches the high water mark 31, priority switches to the store buffer 30. Possibly, a LOAD is accessing the external cache 26 when the STORE instruction arrives in the store buffer entry which represents the high water mark 31. The LOAD must be allowed to finish before the STOREs begin to access the external cache 26. The LOAD may take S clock cycles before the STOREs in the store buffer 30 can begin accessing the external cache 26. After the LOAD is finished, one more STORE may be dispatched during the S clock cycles required to service the oldest STORE. Thus, only one entry is required above the high water mark 31 if the previous assumptions were made.

More typically, however, although the latencies of STOREs and LOADs are known, there are no constraints on the frequencies of STORE operations.

In that case, processor stalls are possible. For example, if a STORE is issued every clock cycle and a STORE takes more than one clock cycle to process in the external cache 26, the store buffer 30 will become full and block the processor even though the store buffer 30 has priority. In this scenario, the number of entries above the high water mark 31 is selected through operations research types of optimization techniques so as to provide the best possible performance and cost tradeoff given a probabilisticly modeled distribution of instructions. The more entries above the high water mark 31, the less frequently the execution pipeline will be blocked by a full STORE buffer 30.

There are several costs to increasing the number of entries above the high water mark 31. For a given store buffer depth, when the number of entries above the high water mark 31 is increased, the number of entries below the high water mark 31 is decreased. Therefore, by increasing the number of entries above the high water mark 31, although the frequency of store buffer blocking is reduced, the average LOAD latency will increase because the load buffer 20 loses priority sooner. Increasing the average LOAD latency results in more frequent processor stalls due to data not being loaded by the time it is needed to be used as an operand of a subsequent instruction. Moreover, the load buffer 20 may become full while the store buffer 21 has priority. The load buffer 20 becoming full also blocks the processor when a LOAD instruction can not be dispatched into the full load buffer 20. Thus, having too few entries below the high water mark 31 in the store buffer 30 can increase the frequency of stalls due to load latency.

According to the first embodiment of the present invention, once the store buffer 30 has gained priority, its entries are processed until the "low water mark" 32 is reached. When the store buffer 21 reaches the low water mark 32, the load buffer 20 gains priority again. The proper placement of the low water mark 32 is again dependent upon a number of variables. During the period that the store buffer 30 has priority, the STOREs are continuously utilizing the external cache 26. Thus, the minimum amount of time during which the store buffer retains priority and occupies the external cache 26 can be calculated. Since the store buffer 30 begins submitting its entries to the external cache 26 as soon as the high water mark 31 is reached, and continues to feed entries to the external cache 26 until the low water mark is reached, the minimum duration of the store buffer's occupation of the external cache 26 is the STORE latency times the number of entries from the high water mark 31 to the low water mark 32. Thus, the key parameter in the placement of the low water mark 32 is the number of entries between the high water mark 31 and the low water mark 32. STOREs may enter the store buffer during the time that the store buffer has priority, thus increasing accordingly the amount of time that the store buffer occupies the external cache. The number of entries below the low water mark 32 is only important to the extent that having more entries below the low water mark 32 increases the average STORE latency, which is usually not timing critical anyway.

In an actual implementation, certain exceptions to the general rules stated above may exist. In certain cases, the store buffer may return priority to the load buffer after the store buffer has reached the high water mark but before the store buffer has reached the low water mark. For a first example, a processor may support a type of STORE which is logically coupled to a LOAD. In this case, the STORE cannot leave the store buffer until the LOAD it is locked against leaves the load buffer. If the load buffer were not allowed to regain priority in this case, a deadlock would exist, since neither buffer could access the external cache. For a second example, sometimes a STORE cannot leave the store buffer until some other event, such as an earlier noncacheable STORE, has finished. Since a noncacheable STORE does not access the external cache, but rather must proceed to main memory or elsewhere, the earlier noncacheable STORE may take a very long time. In this case, the store buffer might give up priority even if the low water mark has not been reached.

In a realistic implementation, there are also situations in which the store buffer assumes priority before it reaches the high water mark. For example, in a multi-processor architecture when the store buffer has "lost" arbitration to the load buffer a large number of times, the store buffer may be permitted to assume priority. This could occur, for example, when one processor is executing a tight loop which continually LOADs a "mailbox" location to see if any new data has been delivered to that location. If a second processor is attempting to store data to the mailbox, a deadlock will occur if the STORE is not allowed to deliver its "mail" because the first processor is continually looking in the mailbox. Such exceptions to the general rules explained herein will exist, and the claims are intended to cover such variances.

Figure 4:
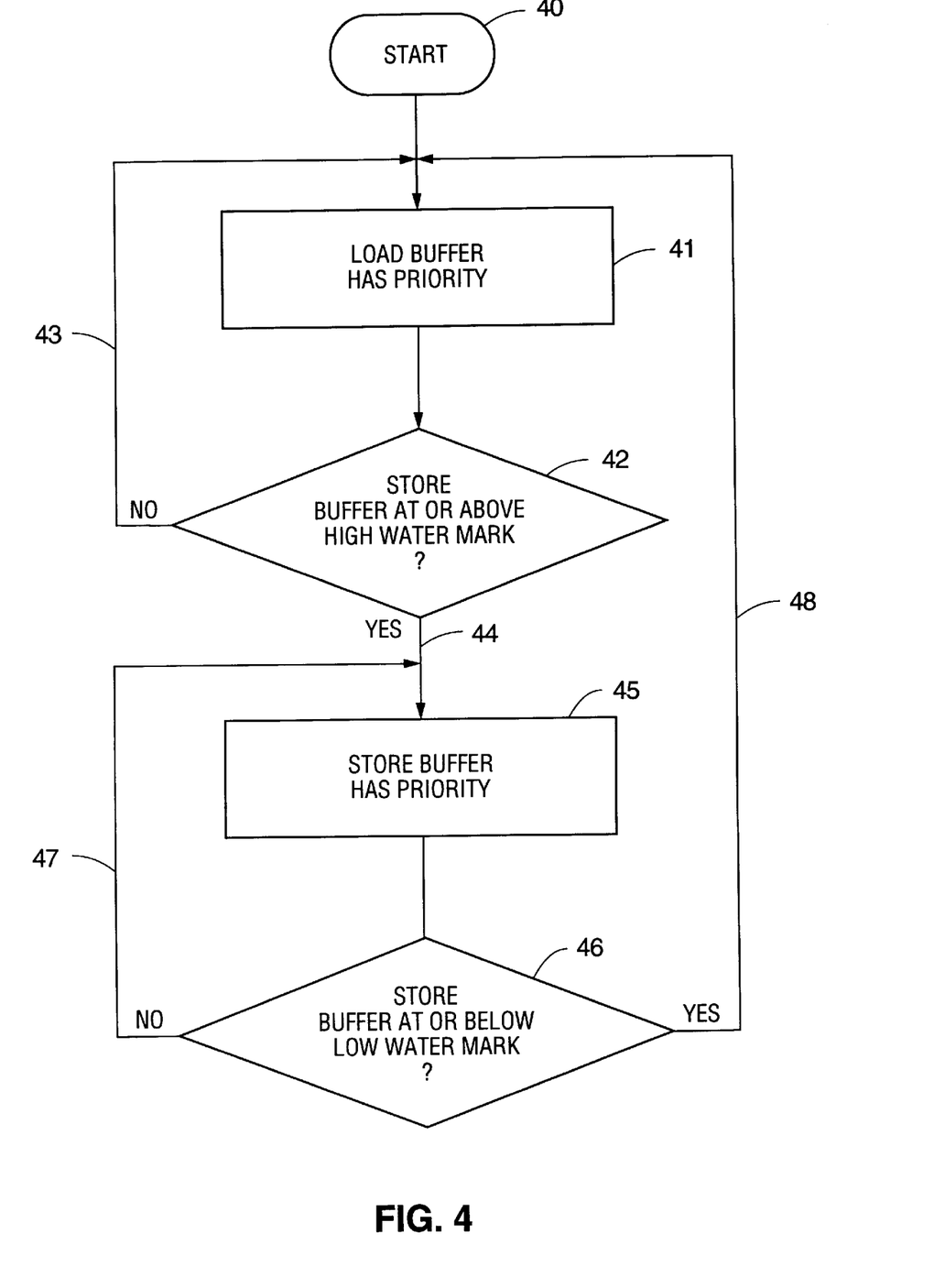
FIG. 4 is a flowchart showing the method according to the first embodiment of the present invention.

FIG. 4 illustrates the control of the load and store buffers. When the system is initialized and both the load buffer and the store buffer are empty, step 40 dictates that the system begins operating with the load buffer having priority 41. While the load buffer has priority, step 42 continually checks to see if the store buffer has filled to the high water mark or above. As long as the number of STOREs in the store buffer is below the high water mark, the control follows branch 43, and the load buffer maintains priority 41. If in step 42 it is determined that the store buffer is filled with STOREs at or above the high water mark, branch 44 is taken, and the store buffer gains priority 45. While the store buffer has priority, step 46 continually checks to see if the store buffer has drained to the low water mark or below. As long as the number of STOREs in the store buffer is above the low water mark, the control follows branch 47, and the store buffer maintains priority 45. If in step 46 it is determined that the store buffer has depleted at or below the low water mark, branch 48 is taken, and the load buffer regains priority 41.

Figure 5:
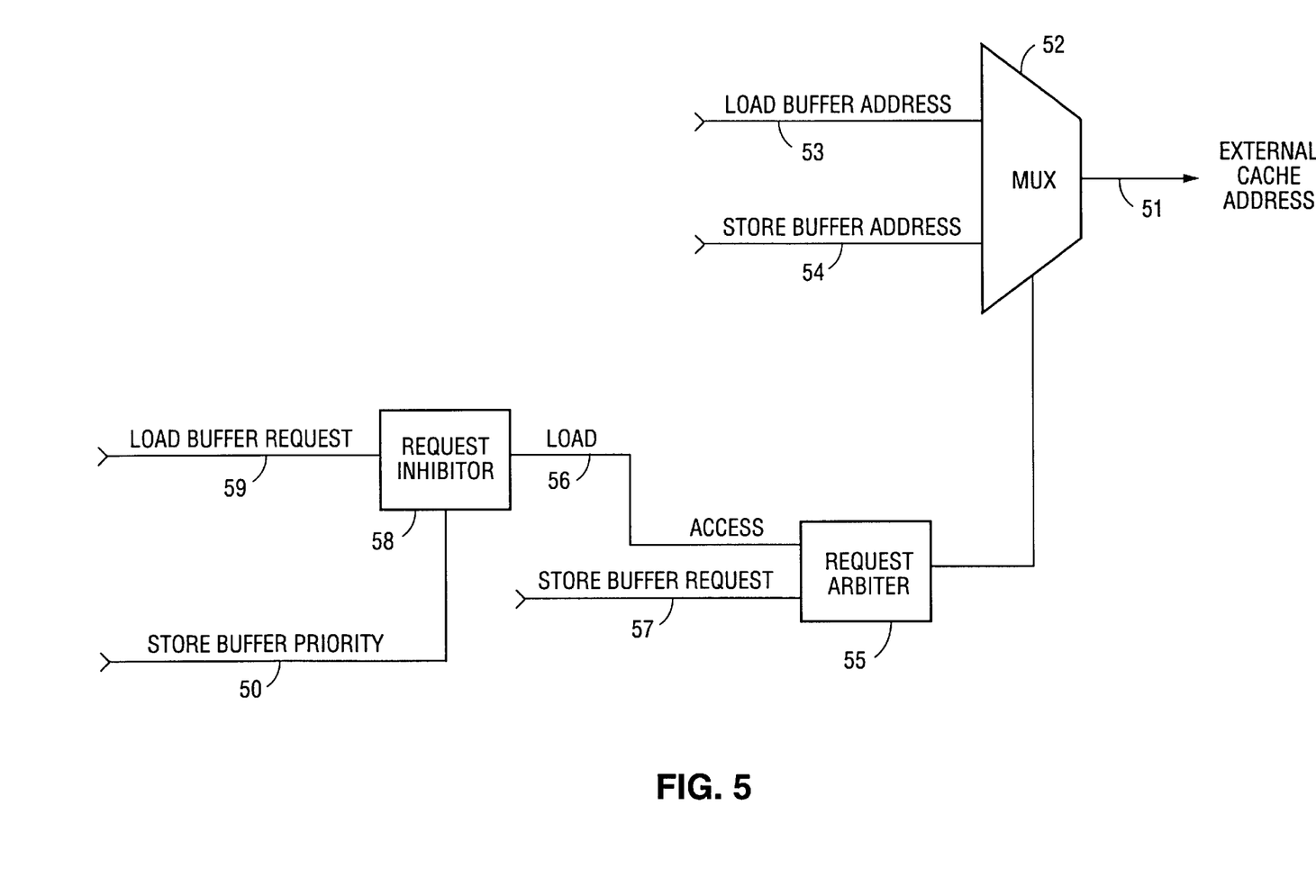
FIG. 5 depicts a circuit structure which can be used to implement the first embodiment of the present invention.

FIG. 5 shows one possible implementation of the control mechanism for this scheme. The external cache RAM has one set of address inputs 51. The multiplexor 52 selects whether the load buffer address 53 or the store buffer address 54 drives the external cache RAM address inputs 51. The decision block 55 implements an extremely simple algorithm. If the "Load Access" signal 56 is asserted, the load buffer address 53 is selected. If the Load Access signal 56 is not asserted and the "Store Buffer Request" signal 57 is asserted, the store buffer address 54 is selected. In order to implement the control algorithm according to the first embodiment, an "inhibit" block 58 is introduced which calculates the Load Access signal 56. When the high water mark 31 is reached, the inhibit block 58 is disabled from asserting the Load Access signal 56 by a store buffer priority signal 50. Whenever this occurs, the Store Buffer Request signal 57 is guaranteed to be asserted, since there are entries in the store buffer 30 (in FIG. 3). After the store buffer 30 has been serviced and when the number of entries in the store buffer 30 reaches the low water mark 32, the inhibit block 58 that produces the Load Access signal 56 allows that signal to be asserted again if the "Load Buffer Request" signal 59 is asserted.

In practice, there may be other units aside from the load buffer and store buffer which also contend for the same memory resource and which have even lower priorities than the load or store buffer. For example, an instruction fetch unit may also utilize the same resource. In that case, the decision block 55 would have more inputs, and the multiplexor 52 would also have additional inputs.

This first embodiment pays no attention at all to the state of affairs in the load buffer 20 (in FIG. 2). Thus, the load buffer 20 may become full during the time that the store buffer 21 has priority. If several LOADs are issued into the load buffer 20 while the store buffer 21 has priority and is draining, the load buffer 20 may block the execution pipe.

Figure 6:
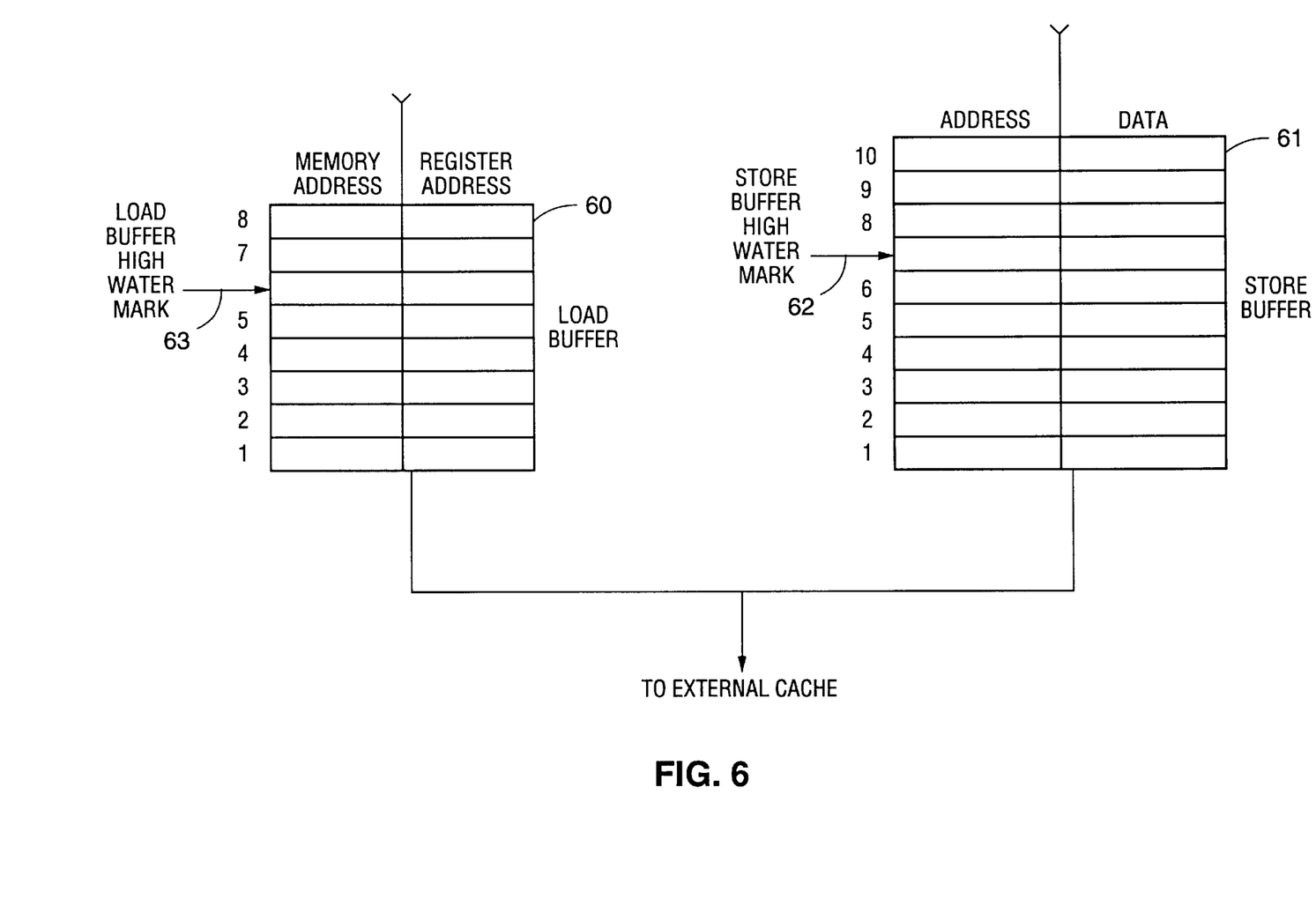
FIG. 6 illustrates a load buffer and a store buffer according to the second embodiment of the present invention.

FIG. 6 illustrates the load buffer 60 and store buffer 61 according to a second embodiment of the present invention. According to this embodiment, the priority protocol is as follows. The load buffer 60 maintains priority until the store buffer 61 reaches a "high water mark" 62. When the store buffer 61 reaches its high water mark 62, the store buffer 62 gains priority until the load buffer 60 reaches its own high water mark 63. When the load buffer 60 reaches its high water mark 63, priority shifts back to the load buffer 60. If both buffers 60 & 61 are above their respective high water marks 63 & 61, the load buffer 60 has priority. FIG. 6 shows an 8 entry load buffer 60 and a 10 entry store buffer 61. The levels of the high water marks 63 & 62 are independently designed.

Figure 7:
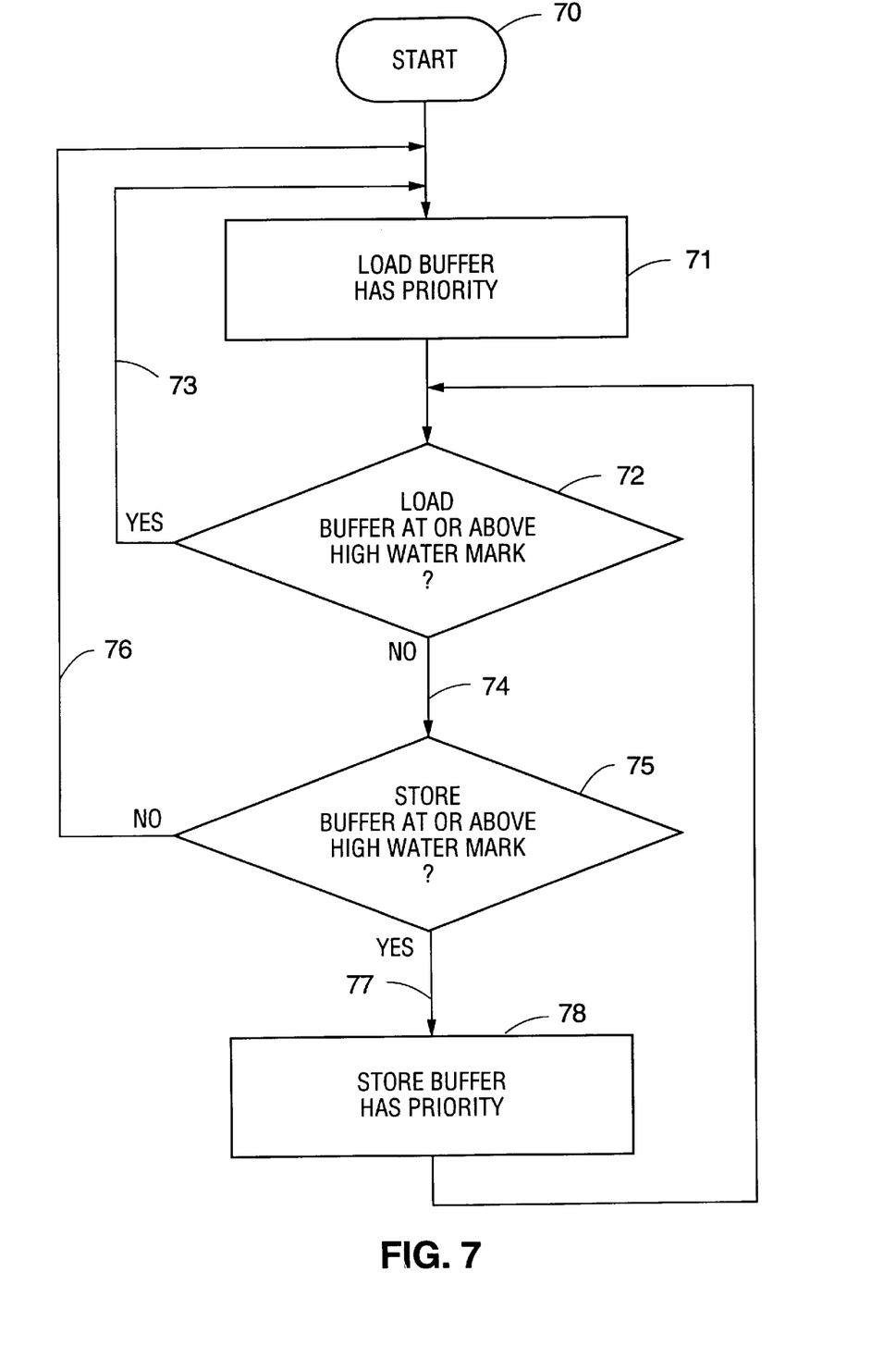
FIG. 7 is a flowchart showing the method according to the second embodiment of the present invention.

FIG. 7 is a flowchart showing the progression of control according to the second embodiment of the present invention. When the system is being initialized, the start bubble 70 places the system in a state where the load buffer has priority 71. Step 72 tests whether or not the load buffer is at or above its high water mark. If the load buffer is filled at or above the high water mark, branch 73 is taken and the load buffer maintains priority 71. If the load buffer is below the high water mark, branch 74 takes the process flow to step 75. Step 75 is a test which determines if the store buffer is at or above its high water mark. If the store buffer is below its high water mark, branch 76 takes the process back to the load buffer having priority 71. If the store buffer is below its high water mark, branch 77 grants the store buffer priority 78 until the load buffer reaches its high water mark again 72.

This scheme places the greatest importance on the avoidance of processor blocking due to either of the buffers being full. In terms of preventing blocking, this scheme will outperform the one of the first embodiment. However, this scheme allows the store buffer to gain and maintain priority for long periods of time. Thus, this embodiment compromises the latency requirements for LOAD instructions in order to prevent blocking. Therefore, the processor may become stalled due to the non-availability of load data which needs to be used by a current instruction.

If the store buffer 61 (in FIG. 6) reaches the high water mark 62 thus gaining priority, the load buffer 60 does not regain priority until it reaches its high water mark 63. It is possible that the store buffer 61 gains priority while there are several entries in the load buffer 60. If a series of STOREs are then dispatched, the store buffer 61 will retain control of the external cache as long as the store buffer 61 is not empty and the load buffer 60 has not reached its high water mark 63. If no additional LOADs are dispatched to put the load buffer 60 over the high water mark 63, the existing LOADs in the load buffer 60 stay there getting older and older. The load buffer 60 will not again be serviced until either the STOREs have all been depleted or new entries in the load buffer 60 are dispatched so that the load buffer 60 reaches its high water mark 63. If the LOADs are not serviced before the subsequent "use" instructions which need the load data are ready for execution, the processor stalls. Using this scheme, once the store buffer gains priority, it maintains that priority even if it becomes empty. The load buffer must reach its high water mark to regain priority.

According to either embodiment, another modification can be made which provides added flexibility to either system. By the modification, the water marks are made programmable by the operating system or the compiler to set the levels of the marks in a manner enabling optimal performance. Thus, in the first embodiment, the store buffer's high and low water marks would become dynamically programmable. The levels for the high water mark and low water mark in the store buffer for the first embodiment could be changed dynamically based upon the nature of the instruction stream of the program being executed. Similarly, the levels of the store buffer high water mark and the load buffer high water mark would become dynamically alterable.

While the method and apparatus of the present invention has been disclosed above with particular reference to the presently preferred alternate embodiments, those or ordinary skill in the art will be enabled by this disclosure to recognize that the present invention may be practiced with modification and alteration within the spirit and scope of the appended claims. Accordingly, the specifications and drawings are to be regarded in an illustrative rather than a restrictive sense.

What is claimed is:

1. A method for assigning priority to a load buffer and a store buffer which contend for a memory resource, comprising the steps of:
   (a) granting the load buffer priority;
   (b) testing whether the store buffer is above an upper threshold indicating a potential impending stall condition;
   (c) granting the store buffer priority to avoid a potential stall if step (b) determined that the store buffer is above the upper threshold; and
   (d) returning to step (a) if step (b) determined that the store buffer is at or below the upper threshold.

2. A method as in claim 1, wherein the upper threshold is programmable.

3. A method for assigning priority to a load buffer and a store buffer which contend for a memory resource, comprising the steps of:
   (a) granting the load buffer priority;
   (b) testing whether the store buffer is above an upper threshold;
   (c) granting the store buffer priority if step (b) determined that the store buffer is above the upper threshold;
   (d) returning to step (a) if step (b) determined that the store buffer is at or below the upper threshold;
   (e) testing whether the store buffer is below a lower threshold;
   (f) granting the store buffer priority and then returning to step (e), if step (e) determined that the store buffer is at or above the lower threshold; and (g) returning to step (a) if step (e) determined that the store buffer is below the lower threshold.

4. A method as in claim 3, wherein the lower threshold is programmable.

5. A method for assigning priority to a load buffer and a store buffer which contend for a memory resource comprising the steps of:

(a) granting the load buffer priority;

(b) testing whether the load buffer is above a load buffer upper threshold indicating a potential impending stall condition; and (c) returning to step (a) to avoid a potential stall if step (b) determined that the load buffer is above the load buffer upper threshold.

6. A method as in claim 5, wherein the load buffer upper threshold is programmable.

7. A method for assigning priority to a load buffer and a store buffer which contend for a memory resource comprising the steps of:

(a) granting the load buffer priority;

(b) testing whether the load buffer is above a load buffer upper threshold;

(c) returning to step (a) if step (b) determined that the load buffer is above the load buffer upper threshold;

(d) testing whether the store buffer is above a store buffer upper threshold, if step (b) determined that the load buffer is at or below the load buffer upper threshold;

(e) returning to step (a) if step (d) determined that the store buffer is at or below the store buffer upper threshold;

(f) granting the store buffer priority if step (d) determined that the store buffer is above the store buffer upper threshold; and (g) returning to step (b).

8. A method as in claim 6, wherein the store buffer upper threshold is programmable.

9. An apparatus for providing a memory address comprising:

an inhibit circuit having a load buffer request input, a store buffer priority input, and a load access output;

a two-way multiplexor having a select input and an output which delivers the memory address, wherein one input is attached to a load buffer address, and another input is attached to a store buffer address; and a decision circuit having first and second inputs and an output, wherein the first input of the decision circuit is attached to a store buffer request signal, the second input is attached to the load access output of the inhibit circuit, and the output supplies the select input of the two-way multiplexor.

10. An apparatus for providing a memory address comprising:

an inhibit circuit having a load buffer request input, a store buffer priority input, and a load access output;

a two-way multiplexor having a select input and an output which delivers the memory address, wherein one input is attached to a load buffer address, and another input is attached to a store buffer address; and a decision circuit having first and second inputs and an output, wherein the first input of the decision circuit is attached to a store buffer request signal, the second input is attached to the load access output of the inhibit circuit, and the output supplies the select input of the two-way multiplexor, wherein the load access output is asserted when the load buffer request input and the store buffer priority input are both asserted, and wherein the load access output is deasserted when either the load buffer request input or the store buffer priority input is deasserted.

11. An apparatus for providing a memory address comprising:

an inhibit circuit having a load buffer request input, a store buffer priority input, and a load access output;

a two-way multiplexor having a select input and an output which delivers the memory address, wherein one input is attached to a load buffer address, and another input is attached to a store buffer address; and a decision circuit having first and second inputs and an output, wherein the first input of the decision circuit is attached to a store buffer request signal, the second input is attached to the load access output of the inhibit circuit, and the output supplies the select input of the two-way multiplexor, wherein the decision circuit produces an output which selects the load buffer address when the load access signal is asserted, and produces an output which selects the store buffer address when the load access signal is deasserted and the store buffer request signal is asserted.

12. A method for providing a memory address output comprising the steps of:

inhibiting a load buffer request output by a load buffer from occurring when a store buffer has priority;

selecting a load buffer address for output when a load buffer request occurs; and selecting a store buffer address for output when a store buffer request output by the store buffer occurs in absence of a load buffer request.

13. A method as in claim 12, wherein the inhibiting step is performed by logically ANDing a signal from the load buffer with a store buffer priority signal.

14. An apparatus for assigning priority to a load buffer and a store buffer which contend for a memory resource, comprising:

a first test circuit having a store buffer upper threshold signal as output for testing whether the store buffer is above an upper threshold indicating a potential impending stall condition; and a store buffer priority circuit taking the store buffer upper threshold signal as input for granting the store buffer priority if the store buffer is above an upper threshold, wherein the apparatus is operable to assign relative priorities to the load buffer and the store buffer to avoid a potential stall.

15. An apparatus for assigning priority to a load buffer and a store buffer which contend for a memory resource, comprising:

a first test circuit having a store buffer upper threshold signal as output for testing whether the store buffer is above an upper threshold;

a store buffer priority circuit taking the store buffer upper threshold signal as input for granting the store buffer priority if the store buffer is above an upper threshold;

a second test circuit having a store buffer lower threshold signal as output for testing whether the store buffer is below a lower threshold; and a load buffer priority circuit taking the store buffer lower threshold signal as input for granting the load buffer priority if the store buffer is below the lower threshold.

16. An apparatus for assigning priority to a load buffer and a store buffer which contend for a memory resource comprising:
- a first test circuit having a load buffer upper threshold signal as output for testing whether the load buffer is above a load buffer upper threshold indicating a potential impending stall condition; and
- a load buffer priority circuit taking the load buffer upper threshold signal as input for granting the load buffer priority to avoid a potential stall if the load buffer is above the load buffer upper threshold.

17. An apparatus for assigning priority to a load buffer and a store buffer which contend for a memory resource comprising:
- a first test circuit having a load buffer upper threshold signal as output for testing whether the load buffer is above a load buffer upper threshold;
- a load buffer priority circuit taking the load buffer upper threshold signal as input for granting the load buffer priority if the load buffer is above the load buffer upper threshold;
- a second test circuit having a store buffer upper threshold signal as output for testing whether the store buffer is above a store buffer upper threshold; and
- a store buffer priority circuit taking the store buffer upper threshold signal as input for granting the store buffer priority if the store buffer is above the store buffer upper threshold and the load buffer is below the load buffer upper threshold.

18. An apparatus for providing a memory address output comprising:
- an inhibit circuit having an inhibit signal as output for inhibiting a load buffer request output by a load buffer from occurring when a store buffer has priority; and
- a select circuit taking the inhibit signal as input for selecting a load buffer address for output when a load buffer request occurs, and for selecting a store buffer address for output when a store buffer request output by the store buffer occurs in absence of a load buffer request.

19. An apparatus as in claim 18, wherein the inhibit circuit is a logical AND of a signal from the load buffer and a store buffer priority signal.

* * * * *